United States Patent [19]
Griffiths

[11] 4,052,736
[45] Oct. 4, 1977

[54] LINE-SEQUENTIAL COLOR TELEVISION ENCODING AND DECODING SYSTEM

[75] Inventor: Frank Anthony Griffiths, London, England

[73] Assignee: Decca Limited, London, England

[21] Appl. No.: 645,717

[22] Filed: Dec. 31, 1975

Related U.S. Application Data

[63] Continuation-in-part of Ser. No. 508,814, Sept. 24, 1974, abandoned.

[30] Foreign Application Priority Data

Nov. 7, 1975   United Kingdom ............... 46202/75

[51] Int. Cl.² .................... H04N 9/40; H04N 9/535
[52] U.S. Cl. .......................................... 358/37; 358/14
[58] Field of Search ................. 358/4, 11, 12, 14, 37

[56] References Cited

U.S. PATENT DOCUMENTS

| | | | |
|---|---|---|---|
| 3,786,178 | 1/1974 | Schulz | 358/4 |
| 3,798,353 | 3/1974 | Illetschko | 358/37 |
| 3,871,019 | 3/1975 | Bingham | 358/12 |

*Primary Examiner*—John C. Martin
*Attorney, Agent, or Firm*—Mawhinney & Mawhinney & Connors

[57] ABSTRACT

A line-sequential color television system in which each line of a transmitted signal is compared in a decoder with an earlier line of corresponding chrominance and each line is averaged to form a luminance signal. The signals thereby derived are used to reconstitute the luminance component of the transmitted signal to preserve vertical detail therein notwithstanding any averaging of the transmitted signal for the extraction of chrominance components.

47 Claims, 8 Drawing Figures

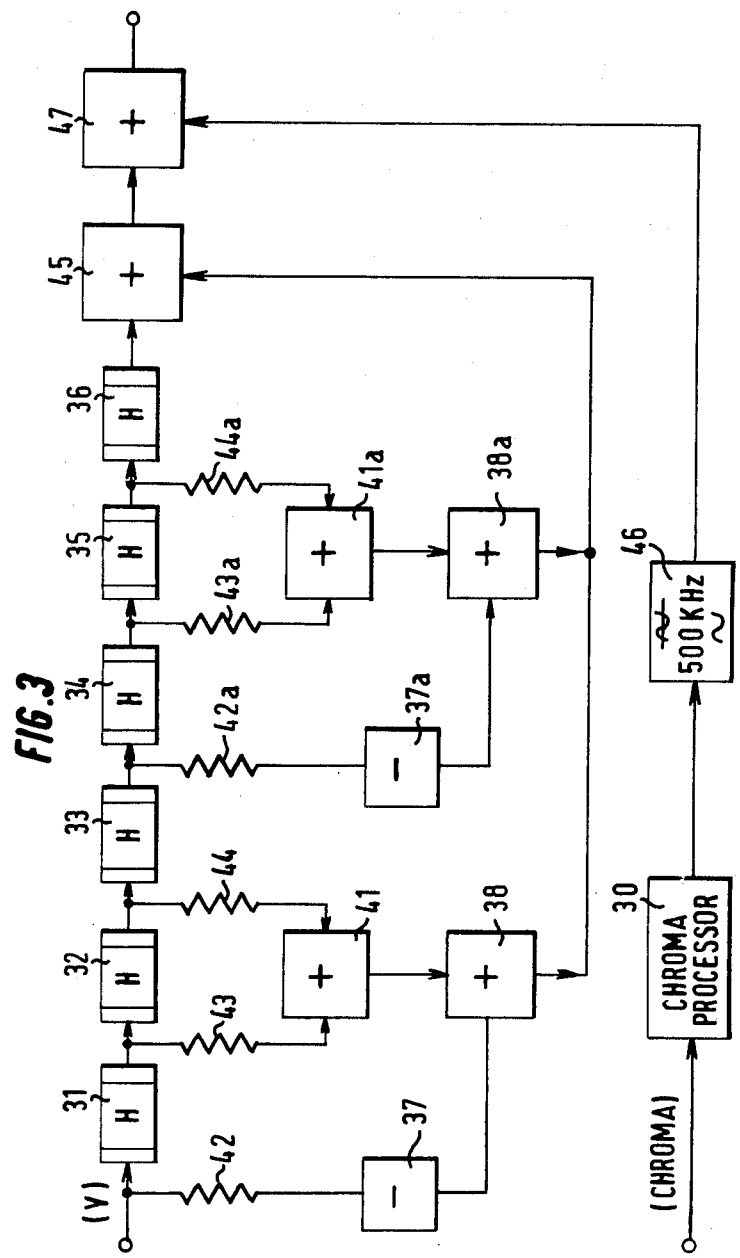

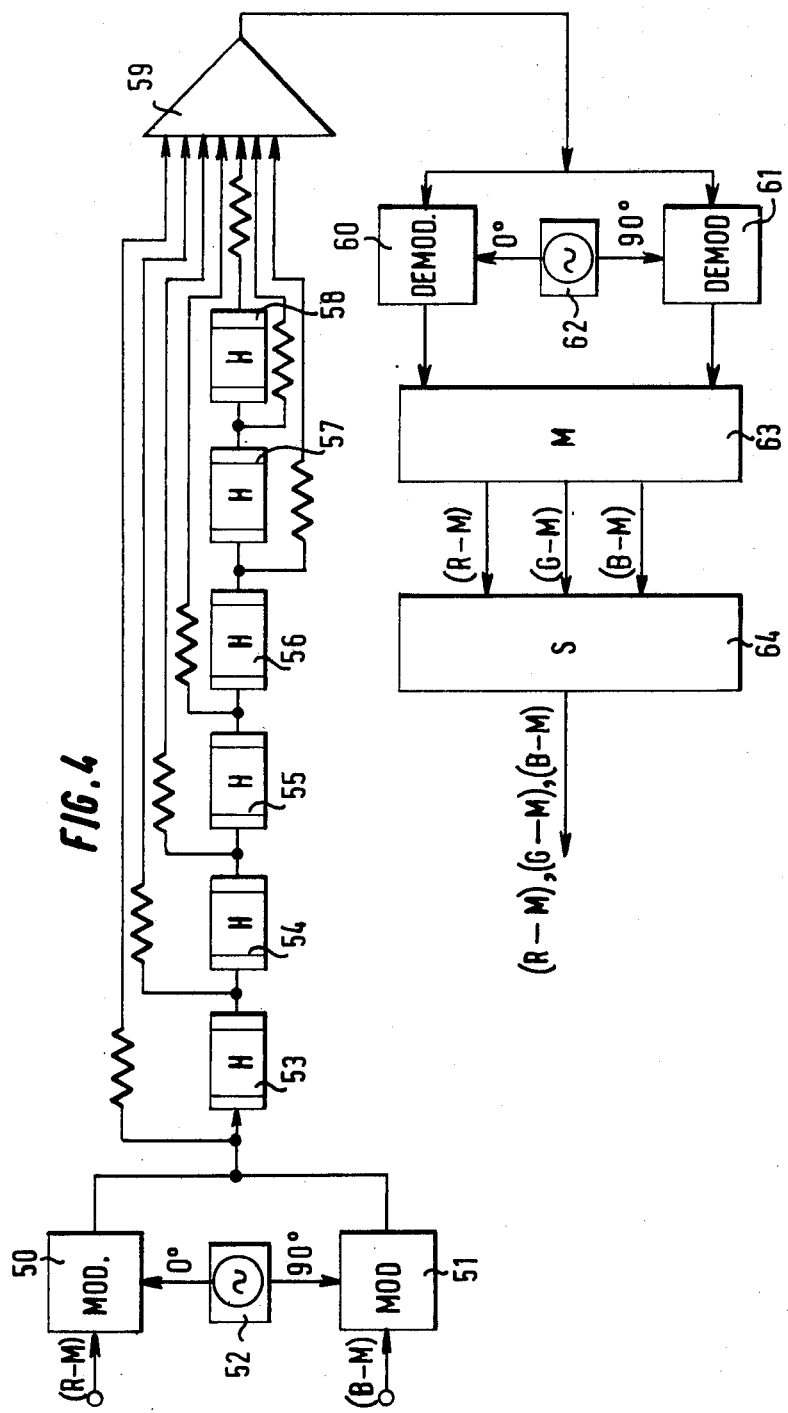

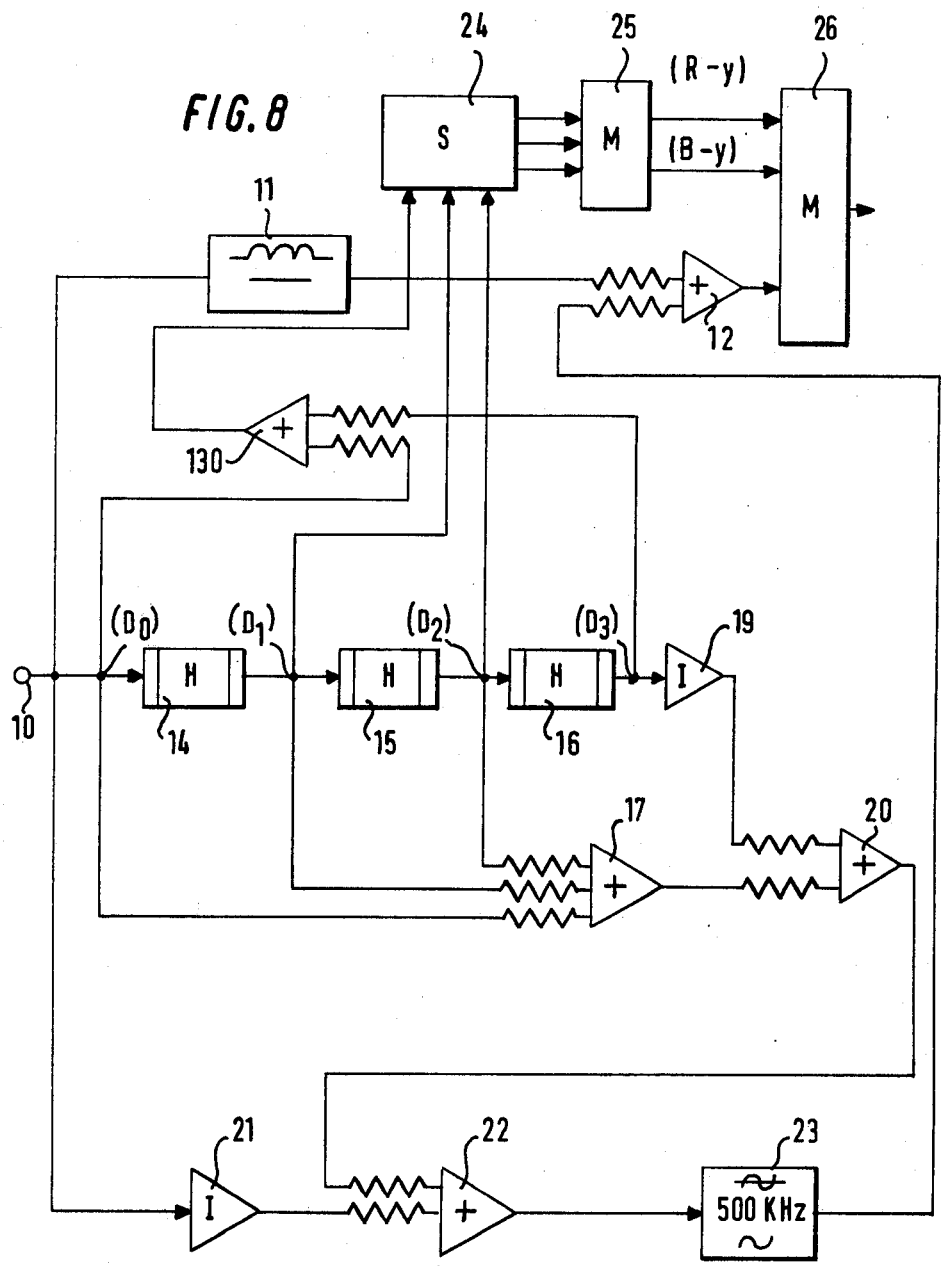

LINE-SEQUENTIAL COLOR TELEVISION ENCODING AND DECODING SYSTEM

CROSS-REFERENCE TO RELATED APPLICATION

This application is a continuation-in-part of my prior co-pending Application Ser. No. 508,814 filed Sept. 24, 1974, now abandoned.

FIELD OF THE INVENTION

The present invention relates to colour television systems, and in particular to a colour television system in which for each line of a television signal there is transmitted a luminance component together with a chrominance component which occupies a part of the band-width of the luminance signal and which represents in line sequence a succession of different color components. In a preferred embodiment of the invention the chrominance components each comprise a signal representing the difference between a respective primary colour component (R, G, B namely red, green and blue) and a modified luminance signal $M = (R + G + B)/3$ but in general the term "chrominance component" is intended to refer to one of a set of components which in combination represent the low-frequency chromatic content of the picture which the transmitted signal represents.

BACKGROUND TO THE INVENTION

The transmission of the luminance component and the chrominance component of a color television signal with full band-width is often impractical or unnecessary. For example, the television signal may be recorded on and played back from a mechanically playable disc which can provide a band-width which is suitable for a luminance signal but is not suitable for the simultaneous transmission of all the chrominance information as well. It has been proposed to transmit only one chrominance component at a time in line sequence and to reconstitute the television signal at a receiver by delaying the received signal by a sufficient number of lines to make all the chrominance components in one cycle of the sequence simultaneously available. Such a technique is exemplified by the arrangements described in, for example, British Patent Specification No. 1185197 and U.S. Pat. No. 3,560,635. When three chrominance components are transmitted in this manner the chromatic content of any line in a reconstituted television picture is formed in part from the content of two preceding lines and accordingly there is necessarily a loss in the definition of the picture in the "vertical" sense. Because the human eye is relatively insensitive to high frequency colour variations, one may, as the aforementioned specifications disclose, improve the definition of a television picture of which the chrominance content is of low frequency by the addition of high-frequency luminance signals. This technique envisages the transmission of a luminance signal combined with a chrominance component which is of lesser band-width than the luminance signal and usually occupies the lower frequency end of the band-width allowed for transmission of the luminance signal. Such a combined signal can be transmitted through a channel of the same band-width as is required for a signal containing only luminance information. However, in recovering from such a combined signal the chrominance components using, for example, two delay-lines to render these components simultaneously available, at least part of the signal is averaged over a number of lines to form each line of the output luminance signal and accordingly there is a considerable loss of the vertical detail in the luminance signal, since this detail is at least partly contained in the lower frequency end of the luminance signal.

SUMMARY OF THE INVENTION

One aspect of the present invention is therefore mainly concerned with improving the vertical definition of the luminance component of a television picture signal which is obtained by decoding a luminance signal and a line-sequential chrominance component of lesser band-width than the luminance signal. For this purpose, a decoder, which may be a player of a recorded signal, is arranged to compare each line of an input signal with an earlier line of corresponding chrominance and preferably reduced definition in order to derive signals which denote vertical luminance transitions. Averaging of the input signal over a plurality of lines can be used to derive low-frequency luminance signals in which lack of vertical detail is compensated by the presence of the signals just previously mentioned. These derived signals, which are normally in the same frequency range as the chrominance component of the input signal, can be used to reconstitute a luminance signal of full band-width notwithstanding the averaging of part of the band-width that contains the sequential chrominance components. Accordingly, the sequential chrominance components can be recovered from the input signal whilst preserving the vertical luminance detail.

Another aspect of the invention concerns encoding, that is to say the preparation of a signal for transmission, which may be recording, in the form described. An encoder will preferably include, in addition to means for forming a line sequential colour television signal, means for reducing the vertical definition of the chrominance components, in order to reduce interference effects which are due to the presence of the derived vertical detail signals. The reduction of definition will reduce the production of moving patterns which are produced in a final picture wherever high-frequency chrominance signals are sampled at a low frequency to produce line-sequential chrominance components.

In order to confine the effects of the derived signals to the region of the transitions that they respectively denote, the signal which is decoded may be reduced in definition by combining each line with evanescent proportions of earlier lines associated with the same chrominance component. The feedback of earlier lines may be performed by the decoder but, according to a further development of the invention, the feedback may be performed by the encoder. The feedback tends to produce a slight ringing in the decoded signal; according to another aspect of the invention the encoder includes means for compensating for this ringing. The compensation preferably comprises forming a signal denoting differences in luminance between one line and the next and adding, in small proportion, this signal to a line which is at least one cycle of chrominance earlier. If the feedback as aforesaid is provided in the encoder it is preferable to include means for sharpening the vertical detail in the encoded signal.

BRIEF DESCRIPTION OF THE ACCOMPANYING DRAWINGS

FIG. 3 illustrates an encoder;

FIGS. 4 and 5 illustrate two forms of a chroma processor for the encoder of FIG. 3;

FIG. 8 illustrates a different form of decoder.

DESCRIPTION OF THE PREFERRED EMBODIMENTS

Figure 6:
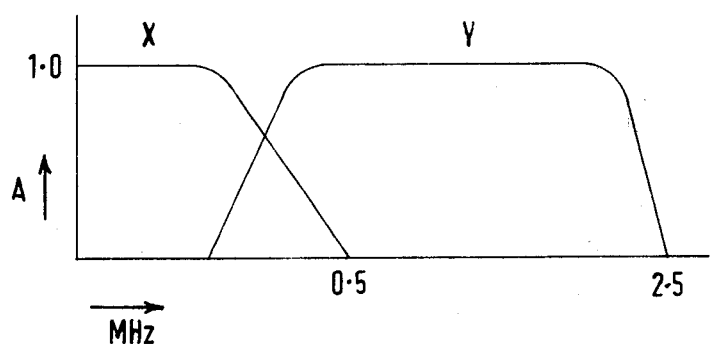
FIG. 6 is a graph of amplitude A against frequency of a line-sequential colour television signal.

It is convenient to describe first the decoding, in accordance with the invention, of a television signal which, as is illustrated in FIG. 6, comprises a luminance component Y which occupies the major portion of the band-width W available for transmission and a chrominance portion X which is restricted in band-width so as to occupy the low-frequency end of the available band-width. The chrominance component is transmitted in line sequence: the colour information is not complete for each line but is transmitted such that only one of a predetermined set of chrominance components is transmitted on every line. It is preferable to transmit the chrominance components in the form (R-M), (G-M) and (B-M) in sequence, where M is a modified luminance signal representing $(R+G+B)/3$. By contrast, the ordinary luminance signal is defined, as is well known, as $(0.3R + 0.59G + 0.11B)$ assuming that red, green and blue are the colour components. Thus the colour components are transmitted as modified line-sequential colour difference signals, by contrast with the normal colour difference signals, for example (R-Y). However the present invention could be adapted for the transmission of such colour difference signals or other combinations of chrominance components. It is convenient to mention here that the chrominance component and the luminance component of each line of the original signal are misregistered, the luminance component being delayed relative to its chrominance component and being transmitted with the chrominance component of an earlier line.

Figure 1:
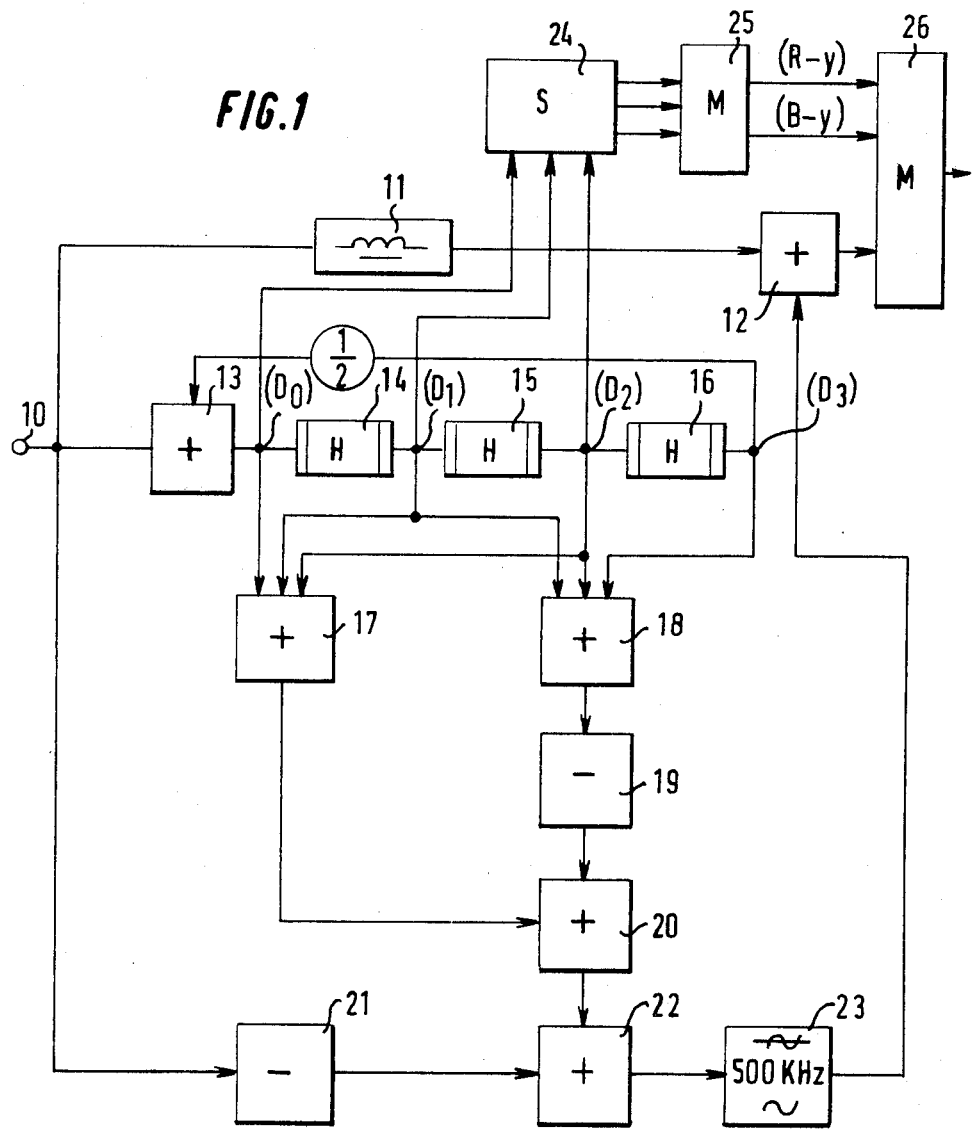
FIG. 1 illustrates a decoder constituting a receiver for a line-sequential colour television signal.

The decoder illustrated in FIG. 1 is illustrated with a source 10, which may be a video-disc record player, from which a signal of the form illustrated in FIG. 6 is received. The input signal from the source passes down several parallel branches. A first of these branches include a short delay 11 which connects the input signal to an adder 12. The input signal is also fed to the input of an adder 13 of which the output is connected to the input of a chain of delay-lines 14, 15 and 16, each having a delay time of the duration of one line. The output of the last delay-line in the chain is connected to the input of the adder 13. The signals combined by the adder are each reduced to a fraction, indicated by equation (i) hereinafter. The fraction may be one half as in this embodiment but a greater or lesser fraction may be selected. The feedback combines with the input signal a proportion of each of those earlier lines which have a component of corresponding chrominance. The proportion diminishes exponentially with age. By this means each signal, $D_0$, $D_1$, $D_2$ and $D_3$ respectively at the output of the adder 13 and each of the delays 14, 15 and 16 comprises one line of the input signal and earlier lines, which include the corresponding chrominance component. The outputs of the adder and the first two delay-lines 14 and 15 are combined in an adder 17 whereas, in the embodiment of FIG. 1, the outputs of the three delay-lines 14 to 16 are combined in an adder 18, inverted in an inverter 19 and combined with the output of the adder 17 in an adder 20. The input signal is inverted in an inverter 21 and compared with the output of the adder 20 by an adder 22. The resultant (chrominance) signal is limited in band-width by a 500KHz low pass filter 23 whose delay is matched by the delay 11. The adder 12 combines this signal with the original input signal.

In this embodiment the inputs to the delay-lines 14, 15 and 16 are tapped off and are fed as described in, for example, the aforementioned specifications, to a set of commutating switches 24 which provide low frequency, continuous chrominance components (R-M), (G-M) and (B-M) in separate channels which feed a matrix 25. The matrix forms two low-frequency colour difference signals (R-Y) and (B-Y) for a matrix 26 which combines these signals with a full band-width luminance signal from the adder 12 to form an output composite signal in PAL form. If an output signal in NTSC or SECAM form is required, appropriate changes can readily be made to the matrixes 25 and 26, which may in practice be constituted by a single matrix which may also perform the function of the adder 12.

The operation of the decoder of FIG. 1, as far as the luminance signal is concerned, is as follows. Each line of the input signal $(D_o)$ is compared with an earlier signal $(D_3)$ of which the chrominance component corresponds to that of the input signal. The comparison produces luminance signal components which, if the luminance of the input signal experiences a marked transition from one line to the next, are of sufficiently high frequency to be capable of indicating that transition. The purpose of the feedback is to ensure that these signal components are evanescent, and thereby to confine their effect to the region of the transition. The feedback effectively reduces the definition of the signal which is compared with the input signal. The transition-defining signal components obtained by the comparison are used to reconstitute the vertical luminance detail of the original luminance signal. More particularly, as equation (vii) indicates, they are used to extract from the input signal the chrominance components of corresponding frequencies. The lowest frequencies of the luminance signal are obtained by forming the average (Y') of the input signal over several lines. These frequencies also are used to reconstitute the original luminance signal. The reconstitution is conveniently effected by using the derived low-frequency signals and edgedefining signals to extract the chrominance component (which extends over a corresponding range of frequencies) from the input signal. A comparison of this chrominance signal with the input signal will yield the original luminance signal.

It is now appropriate to consider the signals present at various points in the circuit at a particular time when the input signal is, for example, $(Y_0 + (R-M)_0)$. The subscripts are zero to denote the present time, a negative subscript indicates an earlier line. The outputs from the adding circuit 13 and the delay lines, namely $D_0$, $D_1$, $D_2$ and $D_3$ are as follows:

$$D_0 = \tfrac{1}{2}(Y_0 + (R-M)_0) + \tfrac{1}{4}(Y_{-1} + (R-M)_{-1}) + \tfrac{1}{8}(Y_{-2} + (R-M)_{-2}) + \ldots \quad \text{(i)}$$

$$D_1 = \tfrac{1}{2}(Y_{-1} + (G-M)_{-1}) + \tfrac{1}{4}(Y_{-2} + (G-M)_{-2}) + \tfrac{1}{8}(Y_{-3} + (G-M)_{-3}) + \ldots \quad \text{(ii)}$$

$$D_2 = \tfrac{1}{2}(Y_{-2} + (B-M)_{-2}) + \tfrac{1}{4}(Y_{-5} + (B-M)_{-5}) \\ + \tfrac{1}{8}(Y_{-8} + (B-M)_{-8}) + \quad \text{(iii)}$$

$$D_3 = \tfrac{1}{2}(Y_{-3} + (R-M)_{-3}) + \tfrac{1}{4}(Y_{-6} + (R-M)_{-6}) \\ + \tfrac{1}{8}(Y_{-9} + (R-M)_{-9}) + \quad \text{(iv)}$$

Thus each of these outputs includes a proportion, exponentially decreasing with age, of lines of corresponding chrominance. A luminance signal of low definition is formed by averaging three consecutive lines to remove the chrominance components. In this embodiment the adder 17 forms the signal:

$$Y' = (D_0 + D_1 + D_2)/3 \quad \text{(v)}$$

The resultant of the three consecutive lines will be substantially a luminance signal by virtue of the form in which the chrominance components are provided, because $$(R-M) + (G-M) + (B-M) = 0.$$

The adder 18 forms a further low resolution luminance signal from the outputs of the three delay-lines namely:

$$Y'' = (D_1 + D_2 + D_3)/3 \quad \text{(vi)}$$

The two luminance signals are combined with the input signal in accordance with the following equation:

$$5Y' - 4Y'' - (Y + (R-M)) = e - (R-M) \quad \text{(vii)}$$

where $e$ represents luminance error signals.

The operation described provides a chrominance signal combined with some spurious edge signals. The subtraction of the two luminance signals ($5Y' - 4Y''$) produces a luminance signal which is similar to the input signal in vertical sharpness but is derived, as indicated above, from the input and a number of previous lines. The chrominance signal which is obtained by comparison of the derived luminance signal and the input signal according to equation (vii) is restricted in band-width by the low pass filter 23 and, in the adder 12, is combined with the input signal from the source 10:

$$Y + (R-M) + (e - (R-M)) = Y + e \quad \text{(viii)}$$

The result of the combination is to cancel the chrominance in the input signal by the derived chrominance signal to recover the input luminance signal of full bandwidth together with some spurious, band-width restricted, signals which produce, subsequent to a sharp vertical luminance transition in a picture obtained at a receiver, a ringing or oscillation. In practice a viewer sees this as ghostly lines spaced at intervals of three lines from the vertical transition. The appearance of the ringing can be reduced by decreasing the attenuation of the signal which is fed back from the output of the chain of delay-lines at the cost of some degradation in the appearance of any vertical edge in the picture.

In practice the formation of the vertical detail signal ($5Y' - 4Y''$) may be simplified because both components of it contain the signal $D_1$ and $D_2$. Accordingly it is simpler to treat the equation:

$$5Y' - 4Y'' = \tfrac{1}{3}(5D_0 + D_1 + D_2) - (4/3\,D_3) \quad \text{(ix)}$$

This equation indicates more clearly the derivation of a detail signal, namely $4(D_0 - D_3)$, from the difference between two signals $D_0$ and $D_3$ of corresponding chrominance and the formation of an average signal, namely ($D_0 + D_1 + D_3$), which contains no chrominance.

Figure 2:
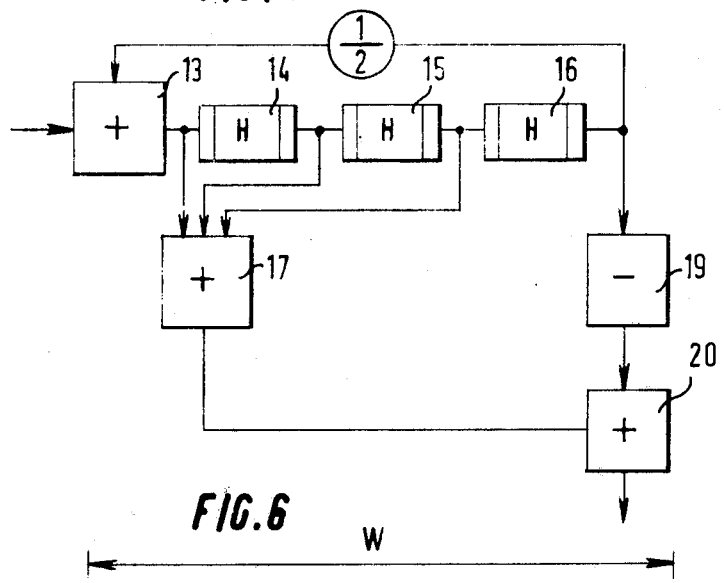
FIG. 2 illustrates part of a modified form of decoder.

The decoder which is partly shown in FIG. 2 differs from the decoder of FIG. 1 only in that it now works directly in accordance with equation (ix). The signal $D_3$ is inverted by the inverter 19 and the adding circuit 18 for combining the signals $D_1$ and $D_2$ with $D_3$ is omitted.

The chrominance signals which are, as previously indicated, obtainable in known manner from three points separated by two delay lines, are affected by the feedback around the chain of delay lines in the decoder. The feedback causes a reduction in the vertical definition of the chrominance signals obtained from the delay lines. This is accompanied by an effective delay of approximately three television lines. Since any transition is denoted by exponential signals, there is some asymmetry in the representation of any vertical chrominance transition. However this asymmetry is to a large extent masked by a reduction, by an encoder, of the definition of the chrominance signals.

It is convenient to mention now that the introduction of feedback is not the only possible method of reducing the definition of the signal that is to be compared with the input signal. An alternative is the use of a longer chain of delay lines which makes simultaneously available a line of the input signal and lines, of corresponding chrominance, occurring before and after (for example three or a multiple of three lines before and after) the line under treatment. The earlier and later lines may be averaged and the resultant compared with the line under treatment.

By way of introduction to an encoder which provides a signal in a form suitable for processing by the decoder previously described, it is desirable to mention some spurious effects which may be generated in greater or lesser degree by virtue of the form in which the television signal is coded. Most colour coding systems generate some spurious information which, depending upon the content of the television picture, may result in degradation of the quality of the picture. The present system will produce some spurious signals in pictures containing sharp vertical transitions of luminance or chrominance. They may generally be regarded as falling into three categories, namely cross-colour (luminance to chrominance), cross-colour (chrominance to luminance) and luminance ringing.

Cross-colour (luminance to chrominance) is an effect familiar to viewers of NTSC, PAL or SECAM television signals; luminance detail is interpreted as colour information in the picture. In these systems however it is the horizontal luminance detail which causes the spurious colour whereas in the system described herein the vertical luminance detail gives rise to colour in the picture. The level of the spurious colour in the picture may be changed if, during encoding and decoding, the chrominance level is changed from the unity gain conditions shown in the equations described so far. Thus during encoding the composite signal may comprise a luminance signal and an adjustable proportion of the sequential chrominance components and any change in said proportion may be compensated, by appropriate amplification, in the chrominance section of the decoder. The larger the amplitude of the chrominance component the less the cross-colour in the final picture.

Cross-colour (chrominance to luminance) describes the production of spurious luminance detail by vertical chrominance transitions, that is to say where the picture contains for example two adjacent vertical bands of different colour but of substantially the same luminance. To minimise the production of spurious detail the vertical resolution of the chrominance should be reduced during encoding. Moreover, a reduction in the encoder chrominance gain will reduce this type of cross-colour. In practice a subjective balance between the two kinds of cross-colour must be found.

Luminance ringing describes the effect of the feedback around the delay-lines of the decoder. The arrangement of delay-lines in effect includes a notch filter which gives rise to ringing after vertical transitions as previously described. Some degree of compensation to reduce the visibility of the effect may be carried out during encoding. For example, two cycles of what is in effect a pre-ring may be introduced in order to provide some phase correction to the ringing pattern together with some reduction of its amplitude.

An encoder for use in the present system is arranged to combine a high-definition luminance signal with a low-definition chrominance signal. The coded signal is for each line of the form Y + K (chrominance component) where K is usually in the range 0.5 to 1.0 and the chrominance component is a line sequence of (R−M), (G−M) and (B−M). The sequence of chrominance is preferably such as to provide an interlaced field with a continuous sequence of red, green and blue as shown in the following table:

| Line | Field 1   | Field 2         |
|------|-----------|-----------------|
| 1    | Y + (R-M) |                 |
| 2    |           | Y + (G-M)       |
| 3    | Y + (B-M) |                 |
| 4    |           | Y + (R-M)       |
| 5    | Y + (G-M) |                 |
| 6    |           | Y + (B-M)       |
| 7    | Y + (R-M) |                 |
| 8    |           | Y + (G-M) .. etc. |

The luminance signal is delayed relative to the chrominance component for the same line by the duration of three lines. Compensation for ringing and reduction in vertical resolution in the chrominance signal are also provided.

FIG. 3 illustrates in schematic form an encoder. The inputs to the encoder comprise a full band-width luminance signal and a chrominance signal. Each line of the chrominance signal corresponds to the simultaneously occurring line of the luminance signal and can be obtained either from a camera or a composite signal by any of a variety of well known expedients. The luminance signal is subjected to six lines of delay that is to say three lines more than is the chrominance signal which is fed through a processor 30 which introduces three lines of delay and is combined with the luminance signal by an adder.

The encoder includes six delay lines 31 to 36 so as to introduce two three-line cycles of compensation for the ringing that occurs after a vertical transition by virtue of the spurious signals which cannot be eliminated by the decoder. Accordingly there is added to the luminance signal which passes through the chain of six delay-lines two signals which are each similarly derived from a respective set of three delay-lines and constitute the difference in detail between firstly the average luminance of two consecutive lines and secondly the luminance of an immediately following line. The signals which appear at the inputs to the delay-lines 34 to 36 are the next three after the line under treatment and the signals at the inputs of the delay-lines 31 to 36 are the fourth to sixth lines after the line under treatment. Thus for the set of three delay-lines 31 to 33 the input to the first delay-line 31 is inverted, by means of an inverter 37 and combined by an adder 38 with an average formed by an adder 41 connected to the inputs of the two subsequent delay-lines 32 and 33. The proportionality of the input resistor 42 for the inverter 37 and the input resistors 43 and 44 for the adder 38 is such that the output from the adder 41 will be zero if there is no difference in luminance between three consecutive lines of the input signal. Thus the three lines of luminance are combined in the proportions (−2, +1, +1). The previous three lines of luminance are treated in the same way, except that the gain in the difference signal obtained therefrom is twice the gain of the difference signal obtained from the fourth to sixth lines after the line under treatment. Otherwise the stages 37a to 41a correspond to the stages 37 to 41. An adder 45 combines the difference signals from the adders 38 and 38a with the output luminance signal to which is added a line-sequential chrominance signal from the chroma processor 30 by means of an adder 47. The chrominance signal will normally be passed through a low pass filter 46 so as to limit the chrominance component of the output signal to, for example, 500 KHz.

The chrominance component of an input picture for transmission through a system including an encoder and decoder as described herein should ideally be of low vertical definition in order that spurious signals are not generated when the relatively low sampling frequency of one-third of the line frequency is used. If there is high frequency chrominance in the original signal, the sampling which is necessary to produce a line-sequential signal produces moving coloured patterns in a final picture. The production of such patterns can be reduced by reducing the vertical definition of the chrominance signal. This is important for the receiver described earlier, because it is desirable to avoid high frequency chrominance signals in the final output, but the chroma processing which will be described can improve the appearance of a final picture even if the transmitted signal is processed without the use of a receiver as described earlier.

One embodiment of the chroma processor of FIG. 3 is illustrated in FIG. 4. In this case it will be assumed that the input to the processor comprises simultaneous modified colour difference signals namely for example (R−M) and (B−M). These two signals are modulated by respective modulators 50 and 51 in quadrature on a sub-carrier frequency from a source 52 and passed through a set of six-one-line delay lines 53 to 58. The input signal to the delay-lines and the output from each delay-line are fed through input resistors to a summing amplifier 59 which feeds an output to each of two demodulators 60 and 61. These demodulators are fed in quadrature with the sub-carrier frequency from a source 62 (which may be constituted by the source 52). The two chrominance signals are then matrixed in a matrix 63 to form the chrominance signals (R−M), (B−M) and − (R−M) + (B−M) = (G−M) which are then sequentially switched to the output by means of a sampling switch 64 operating at line frequency. In this embodiment each chrominance signal is reduced in vertical definition by its combination with proportions of other lines of chrominance. The proportions are determined by the input resistors to the amplifier 59 and may be selected to produce subjectively the optimum effect in a reproduced picture.

Figure 5:
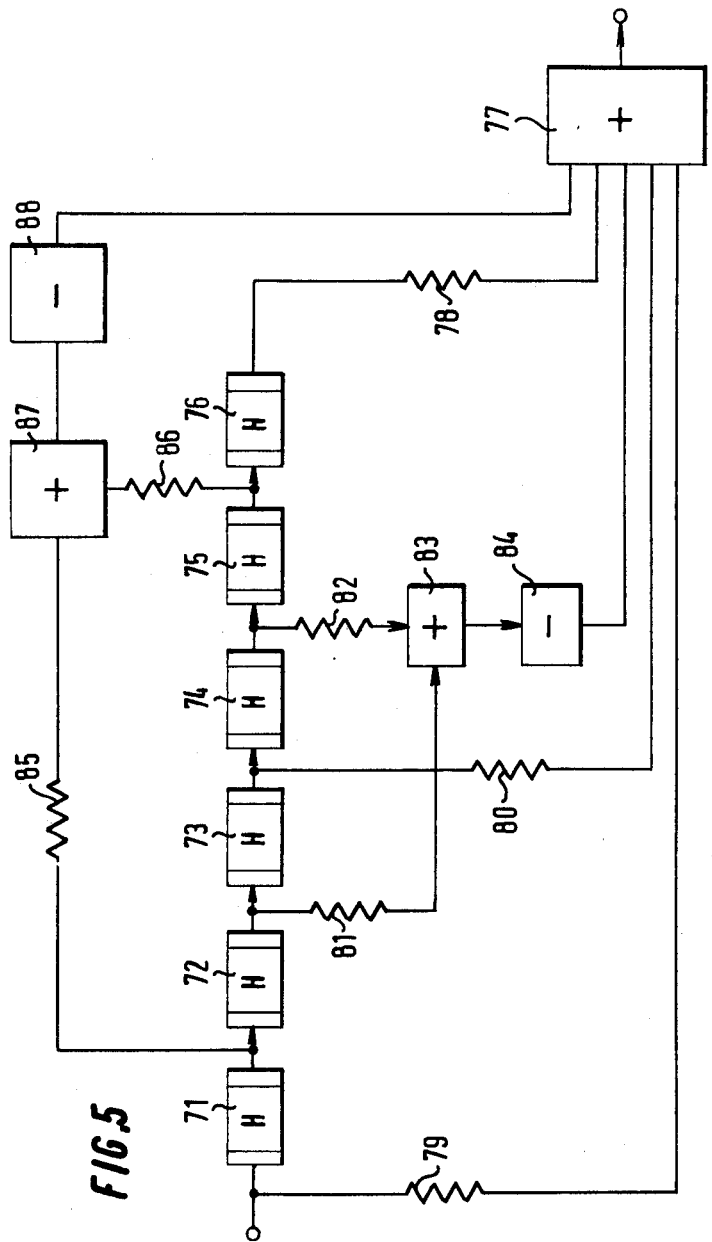

FIG. 5 illustrates the reduction of vertical chrominance definition after sampling. This is somewhat simpler to achieve since only one signal need be processed. A sequential input, that is to say (R−M), (G−M) and (B−M) in turn, which can be obtained by a sampling switch coupled to the output of a matrix which provides the three signals simultaneously, is fed to a chain of delay-lines 71 to 76. The operation of FIG. 5 is easier to understand with the example shown below. If the input is (R−M) then a combination of the second next previous line (−2) and the fourth next previous line (−4) will be $(G-M) + (B-M) = -(R-M)$ and thus from 5 lines of the sequential chrominance signal an output signal of the same chrominance component can be obtained.

Thus in FIG. 5 an adder 77 combines a proportion, determined by the resistor 78, of the output of the sixth delay-line with a proportion, determined by the resistors 79 and 80 of the input signal and the output of the third delay line. All these signals are of corresponding chrominance. The outputs of the second and fourth delay-lines are added in selected proportions, determined by resistors 81 and 82, by an adder 83 and inverted by an inverter 84. The outputs of the first and fifth delay-lines are combined, in proportions determined by resistors 85 and 86, by an adder 87 and are inverted by an inverter 88. The inverters 84 and 88 feed the adder 77 with signals of corresponding chrominance. The various resistors will determine the proportions of the lines which are combined to form the low-definition chrominance signal and they will determine the vertical definition of that signal. The proportions may be adjusted in order to provide subjectively the best final appearance of a picture. In both this embodiment and that of FIG. 4 the average delay of a chrominance signal is three lines in duration.

Although the foregoing embodiments work satisfactorily, the provision of, in effect, a recursive filter in the decoder requires delay lines of small tolerance. Moreover, the decoder requires carefully matched signal processing in at least two channels for deriving the signals which are used to reconstitute the low frequency luminance signal. These possible disadvantages may be obviated by a further development of the invention which is exemplified by FIGS. 7 and 8.

Figure 7:
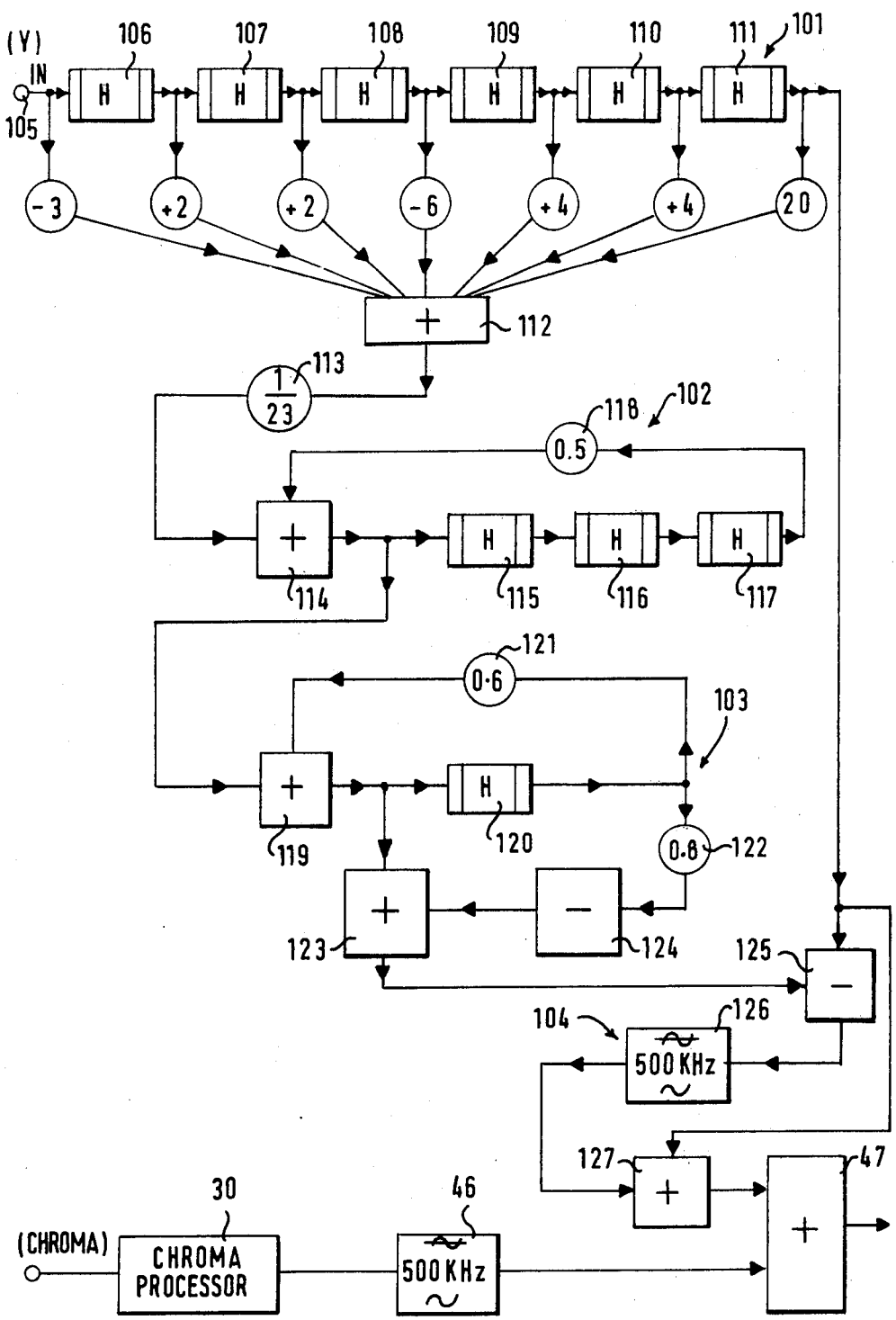
FIG. 7 illustrates a different form of encoder.

The significance of the embodiments of the encoder of FIG. 7 and the decoder of FIG. 8 is that the colour television signal which is presented to the decoder is in a special form in which each line is combined with earlier lines of corresponding chrominance; thus each line which contains for example a red component (or the colour difference signal formed by comparing luminance and the red component) is combined with proportions of earlier lines associated with a red component or red colour difference component. The combination of each line with earlier lines may be confined to the low frequency end of the video spectrum, that is to say normally the first 500 kilohertz of the normal 2 to 2½ megahertz band-width; the part of the band-width of most concern is that shared by the normally bandwidth-limited chrominance components and the low frequency part of the luminance signal. The combination of each line with proportions of earlier lines may be applied to the composite signal, that is to say to the chrominance component as well as to the luminance component in the frequency range just described but may be confined to merely the luminance component in that range.

An encoder for use in the production of a television signal in the special form described preferably forms a combination, for each line of a television signal, of at least the luminance component of common frequency range with the chrominance component with evanescent proportions of the luminance components of earlier lines associated with the same chrominance. The encoder may include a delay corresponding to at least one cycle (that is to say normally three lines) of chrominance and the signal passing through the delay may be combined with a signal at the input of the delay. The magnitude of the signal fed back from the output of the delay may be suitably proportioned, the particular choice depending on a subjective balance between the desired sharpness and the degree of toleration of the ringing effect which is produced in a decoder and which cannot be completely eliminated.

The aforementioned ringing may as described earlier be compensated by introducing a pre-ring by means of which a television line is combined with various normally small proportions of later lines. For example, the encoder may be arranged to combine each line with a signal which constitutes the difference in detail between, firstly, the average luminance of two consecutive lines and secondly the luminance of an immediately following line, this immediately following line being of corresponding chrominance to the line to which the difference in detail is added. In general the encoder will add to each line a relatively negative proportion of a later line and a positive, though smaller, proportion of the line or lines immediately preceding the said later line of corresponding chrominance. More than one cycle of compensation may be added, the proportions of lines in a later cycle being smaller than the lines in a relatively earlier cycle, each cycle here referring to a group of lines constituting a cycle of chrominance and following the line under treatment.

Another feature which may be and preferably is incorporated is the sharpening of signals in the encoder. The sharpness of detail recovered by the decoder is in practice a measure of the relative gains applied to the two signals which are derived, on the one hand, by comparing signals a cycle of chrominance apart and the signal which is formed by averaging a succession of lines to produce a luminance signal. The ratio of the gains may be lessened but if so it is desirable to provide some emphasis of vertical transitions during encoding. For this purpose each line, in the frequency range which will be subjected to averaging in the decoder, may be combined with a fraction of an earlier line and then compared with a greater fraction of that earlier line. A more particular example will be explained hereinafter.

FIG. 7 illustrates principally a luminance signal processor. The processor forms part of an encoder which prepares a line-sequential television signal for transmission or recordal.

The encoder comprises in addition the chroma processor 30, low pass filter 46 and adder 47 of FIG. 3. It will be understood that the chroma processor may assume the form shown in either FIG. 4 or FIG. 5.

The encoder which is illustrated in FIG. 7 includes, as is preferred, a compensator 101 for introducing compensation for ringing, a recursive filter 102, a section 103 which introduces sharpening of line-to-line detail, and a luminance correcting section 104. In this encoder the high frequency part of the luminance signal passes through the compensator 101. However, the high frequency part of the output luminance signal is obtained directly from the compensator 101 and those components of the luminance signal which pass through the recursive filter 102 and the detail sharpener 103 are limited in band-width in order to remove spurious detail which would otherwise be introduced in the high frequency part of the output signal by the recursive filter and the picture sharpener.

A luminance signal which is received at the input 105 of the luminance signal processor is fed through six one-line delays 106 to 111. The input signal and the outputs of each of the delays are combined in various proportions by an adder 112. The purpose of this section is to add to each line, that is to say the instant output from the delay 111, two cycles of compensation for a ringing effect produced by a decoder. This effect arises from a comparison of, by the decoder, signals which are separated by integral cycles of chrominance (i.e. multiples of three lines). The adder 112 adds to the output signal of the delay 111 signals which each correspond to the difference in detail between a signal occurring three or a multiple of three lines later and a signal which is one line earlier than that signal. In practice the difference is formed between the said later signal and the average of the signals one line and two lines earlier respectively than said later signal. For this purpose the adder 112 combines the outputs of the delays 16 and 107 and forms the difference between this average and a signal proportional to the signal at the input 105. A corresponding average is formed from the outputs of the two delay lines 109 and 110 and again a difference between this average and the output of the delay line 108 is formed by virtue of the relatively negative proportion of that output which is combined with the average of the two preceding lines. In this particular embodiment the relative gains of the signals are $-3$, $+2$ and $+2$ for the second cycle of compensation $-6$, $+4$ and $+4$ for the first cycle of compensation and $+20$ for the line under treatment. It will be seen that the sum of the gains of the two signals which are averaged for comparison with the following line produce a slight difference signal even if there is no change of luminance in a succession of lines; this particular choice of the gains is a matter of subjective judgement.

The output from the adder 112 is reduced by an attenuator 113 according to the reciprocal of the algebraic sum of the gains applied to the signals combined by the adder 112.

The input luminance signal as it appears at the output of the delay 111 does not contain any proportion of earlier lines and is fed to the output adder 127 of the processor.

The combined signal from the output of the adder 112 is fed to the recursive filter 102. This comprises an adder 114 followed by three one-line delays 115, 116 and 117. A feedback loop connects the output of the delay 117 to another input of the adder 114 and introduces a gain of 0.5 (i.e. a 6dB attenuation). By means of this filter each line of the signal under treatment is combined with exponentially decreasing proportions of earlier lines which precede the line under treatment by an integral number of cycles of the sequence of chrominance. The output from the recursive filter is taken from the output of the adder 114, but could be taken from any of the delays 115, 116 and 117 if a different delay time in the luminance processor were required.

The signal obtained from the output of the recursive filter is fed to the sharpener 103. The sharpener is arranged to combine the signal with a fraction of the signal which is one line earlier and to form the difference between the resultant combination and a greater proportion of that earlier signal. For this purpose the sharpener comprises an adder 119 of which one input is connected to receive the output of the recursive filter 102, a delay line 120 introducing a delay of one video line, a feedback loop 121 which connects the output of the delay line 120 to another input of the adder 119 and introduces a gain of less than unity, in this example 0.6. The combined signals formed by the output of the adder 119 is compared with a fraction of the output of the delay line 120. For this purpose the output of the delay line 120 is fed through a branch 122 introducing a gain of 0.8, and an inverter 124, the resultant signal being combined with the output of the adder 119 by an adder 123. The effect of the sharpener on for example a rise of one line duration in a luminance signal is to preserve the leading edge and the magnitude of that temporary rise but to emphasise the trailing edge, which is followed by an overshoot and then a gradual return to the original signal value.

It is, as has been mentioned earlier, desirable to apply the recursive feedback and the sharpening of detail only to that part of the video spectrum which will be subjected to averaging in the decoder. This is normally the first 500 kilocycles of the band-width of the video signal, which normally occupies a band-width of about $2\frac{1}{2}$ megahertz. In order to limit the effect of the recursive filter and the sharpener to that part of the spectrum, the output of the sharpener is fed to a comparator 125 wherein it is compared with the luminance signal obtained from the output of the delay 111. The difference signal formed by the comparator 125 is fed through a low pass filter, of which the cut-off frequency is 500 kilohertz, and thence fed to an adder 127 wherein it is combined with the high frequency luminance signal.

The luminance signal obtained from the processor as described is combined by the adder 47 with a line sequential chrominance signal obtained from the chroma processor 30 (followed by the low pass filter 46) and either transmitted or recorded on, for example, a video disc as a spatial modulation of a groove FIG. 8 illustrates a modified decoder which is suitable for decoding television signals which have been encoded by the encoder illustrated in FIG. 7. The decoder resembles that which has been described with reference to FIGS. 1 and 2, but the feedback loop and the adder 13 have been omitted. In this embodiment the input terminal feeds directly the chain of three delay-lines 14, 15 and 16, which serve to render four consecutive lines of the input signal simultaneously available. The signals $D_o$, $D_1$ and $D_2$ are combined in the adder 17. The adder, by an appropriate choice of input resistors in known manner, incorporates an additional proportion of the $D_o$ signal so that it can act (as does the adder 17 in FIG. 1) as part of a comparator by which the signals $D_o$ and $D_3$ are compared to derive a signal denoting vertical luminance changes. The signal $D_3$ at the output of the delay-line 16 is fed through the inverter, shown as an inverting amplifier and combined with the output of the adder 17 by the adder 20. The resultant output of the adder 20 is compared with the input signal by means of the inverter 21 and the adder 22, and otherwise the encoder functions as already described with reference to FIG. 1. The output of the adder 22 is a modified colour difference signal together with spurious error signals, as shown by the right hand side of equation (vii) and the adder 12 functions in accordance with equation (viii) to recover the input luminance signal free from averaging.

It will be recalled that in order to recover a composite colour television signal from a line-sequential signal the line-sequential signal should be passed through at least two one-line delays in order to render a succession of lines containing a complete cycle of chrominance simultaneously available, the chrominance signals being combined and then encoded onto the luminance signal, of which the high frequency part is not passed through the delays. In order to recover the luminance component that is subject to averaging by the delays because it necessarily occupies part of the band-width occupied by the chrominance component, the encoder derives at the output of adder 20 a signal in the form $(\alpha + 1) D_o + D_1 + D_2 - \alpha D_3$ wherein $\alpha$ is positive and greater than unity (preferably 1.5), $D_o$ denotes the present line and $D_1$, $D_2$ and $D_3$ represent the three preceding lines. In this embodiment the adder 17 forms the signal $2.5 D_o + D_1 + D_2$ and the inverter provides $(-D_3)$ which is amplified by a factor of 1.5 by the adder 20. The signal at the output of the adder 20 comprises in effect two signals, namely $(D_o + D_1 + D_2)$ proportional to the average of three consecutive lines and a signal proportional to $(D_o - D_3)$ formed by comparing the input line and a signal, associated with corresponding chrominance, three lines earlier. The signal $(D_o + D_2 + D_2)$ denotes slow luminance changes whereas the signal $\alpha(D_o - D_3)$ represents sharp vertical changes.

The chrominance signals which are recovered by the decoder could be recovered by means of a separate chain of delay-lines but are in practice formed from the signals passing through the three delays 14, 15 and 16. Three of the four available signals may be used but all four signals could be used in order to reduce the interference phenomenon known as cross-colour. Thus for example the signals $D_o$, $D_1$ and $D_2$ may be used. It is also possible to use $D_1$, $D_2$ and $D_3$ or a combination such as $(D_o + D_3)/2$, $D_1$ and $D_2$. FIG. 8 illustrates this last possibility: the signals $D_1$ and $D_2$ are fed to the commutating switches 24 whereas the signals $D_o$ and $D_3$ are fed to an adder which forms the average $(D_o + D_3)/2$ feeds that to the commutating switches, which, as in the embodiment of FIG. 1 operate in the manner described in the aforementioned specifications to produce, in conjunction with the matrixes 25 and 26 an output composite signal conforming to the television standards prescribed.

The decoder will delay the chrominance signal finally obtained by an average of one and a half lines. This delay may be compensated by appropriate mis-registration of the chrominance signal relative to the luminance signal produced by the encoder. If, as in the foregoing example, the luminance signal is delayed by six lines in the processor, the chrominance signal may be delayed by four and a half lines. This delay may be inserted by adding delay in the chroma softener described in the foregoing.

I claim:

1. A colour television signal decoder, comprising means for comparing each line of an input signal in the form of a luminance component combined with a line-sequential chrominance component of lesser bandwidth with a signal containing an earlier line of corresponding chrominance so as to derive a signal denoting vertical luminance changes; means for averaging the input signal over a plurality of lines so as to derive a luminance signal of lower frequency; and means for reconstituting the luminance component from the derived signals in the frequency range of the associated chrominance component.

2. A decoder according to claim 1, in which the means for reconstituting the luminance component comprises means for comparing the said input signal with the derived signals to derive the chrominance component and means for comparing the input signal with this derived chrominance component to recover the luminance component of the input signal.

3. A decoder according to claim 1, in which the means for averaging comprises two delays in series, each corresponding to the duration of one line, and disposed to render a line of the televison signal available simultaneously with the two lines that precede it, and means for combining the lines made thus available.

4. A decoder according to claim 1 and arranged to receive an input signal of which the chrominance component cycles through a sequence of components in the form $(R-M)$, $(G-M)$ and $B-M)$ of which R, G and B represent red, green and blue colour signals and M represents $(R+G+B)/3$.

5. A decoder according to claim 1, further comprising means for obtaining in response to the input signal simultaneously available chrominance components from a plurality of lines which are subjected to different delays.

6. A decoder according to claim 5, further comprising means for combining the said simultaneously available chrominance components with the said luminance component in the form of a composite colour television signal.

7. A colour television signal decoder according to claim 1, wherein said means for comparing comprises:
a delay corresponding to one cycle of said chrominance component; an adder which is coupled to receive the input signal and an output signal from the delay; and means for inverting the said output of the said delay.

8. A colour television signal decoder according to claim 1, further comprising:
a delay corresponding to at least one complete cycle of the line sequence of chrominance in the input signal; and means for feeding to an input of the delay a combined signal comprising a fraction of the input signal combined with a fraction of a signal at an output of the delay, and wherein said means for comparing has inputs connected to the input and output of the delay.

9. A colour television signal decoder according to claim 8, in which said delay comprises a first one line delay having an input, coupled to receive said combined signal, and an output, a second one-line delay having an input, coupled to the output of the first one-line delay, and an output; and a third one-line delay having an input coupled to the output of the second one-line delay; and an output; and in which said means for averaging comprises an adder coupled to the inputs of the first, second and third delays; and in which said means for comparing comprises said adder, an inverter coupled to the output of the third delay and a second adder coupled to outputs of the first adder and the inverter.

10. A colour television signal decoder, comprising:
means for comparing each line of an input signals in the form of a luminance component combined with a line sequential chrominance component of lesser band-width with a signal containing an earlier line of corresponding chrominance so as to derive a signal denoting vertical luminance changes;

means for reducing the definition of the said signal that contains the said earlier line;

means for averaging the said input signal over a plurality of lines so as to derive a luminance signal of lower frequency; and means for reconstituting the luminance component from the derived signals in the frequency range of the associated chrominance component.

11. In a colour television signal decoder, the combination comprising:

means for presenting an input signal in the form of a line sequential colour television signal having a chrominance sequence which repeats every three lines;

first, second and third delay-lines, each having a delay corresponding to one television line, coupled in tandem to receive said input signal;

combining means coupled to the inputs of the said three delay-lines; and comparing means coupled to an output of the third delay-line and an output of said combining means.

12. The combination according to claim 11 further comprising:

attenuating means connected between an output of said third delay-line and a respective input of said first delay-line.

13. A colour television signal decoder comprising:

means for presenting a colour television signal in a form comprising a luminance component of relatively high frequency and a line sequential component of relatively lower frequency, the chrominance component cycling through a sequence of components in the form (R−M), (G−M) and (B−M) of which R, G and B present red, green and blue, and M represents (R+G+B)/3; means for combining each line of the television signal with earlier lines of corresponding chrominance so as to form a signal of reduced definition: means for combining together three successive lines of the reduced-definition signal so as to form a first, low frequency, luminance signal; and means for comparing each line of the signal of reduced definition with an earlier line thereof of corresponding associated chrominance so as to derive a second luminance signal containing higher frequency components than said first luminance signal; and means for combining said first and second luminance signals.

14. A colour television signal decoder according to claim 13 further comprising:

means for comparing the said first and second luminance signals with the input signal to obtain a derived chrominance signal of frequency range corresponding to said first and second luminance signals; and means for subtracting said derived chrominance signal from said input signal.

15. In a colour television signal decoder in which a colour input line-sequential television signal is fed through a plurality of one-line delays and the chrominance component signals which are thereby rendered simultaneously available are cyclically switched and are reconstituted with luminance components to form a composite colour television signal of normal bandwidth, the improvement which comprises: means for delaying each line of the input signal by a time corresponding to at least one cycle of the line sequence of chrominance of the input signal, whereby to render simultaneously available at least two lines of corresponding chrominance; means for comparing the two lines of corresponding chrominance to obtain an edge-defining signal which denotes "vertical" luminance changes; and means for reconstituting the said composite signal from said edge-defining signal in a frequency range which is common to the luminance and chrominance components of the input signal.

16. The improvement according to claim 15 further comprising:

means for averaging successive lines of the input signal to form a low frequency signal of lower frequency content than the edge-defining signal; and means for combining the low frequency signal and edge-defining signal.

17. A colour television signal decoder, comprising:

means for presenting an input signal in the form of a luminance component combined with a line-sequential chrominance component of lesser bandwidth means for combining, in proportions decreasing with age, each line of the input signal with earlier lines of corresponding chrominance so as to form a combined signal which contains a proportion of that input line and decreasing proportions of successively earlier lines of corresponding chrominance:

means for comparing successive combined signals of corresponding chrominance as they are formed so as to derive a first derived luminance signal which denotes any vertical luminance change:

means for averaging a plurality of successive combined signals of different chrominance so as to derive a second derived luminance signal denoting any resultant change in luminance from before to after said vertical luminance change;

means for comparing the input signal with the said first and second derived signals so as to derive the said chrominance component; and, means for comparing the input signal with this derived chrominance component to recover the luminance component of the input signal.

18. A colour television signal decoder, comprising:

a. means for providing an input signal in the form of a luminance component combined with a line-sequential chrominance component of lesser bandwidth than the said luminance component, said chrominance component cycling through a sequence of components in the form (R−M), (G−M) and (B−M) of which R, G and B represent red, green and blue colour signals and M represents (R+G+B)/3, the chrominance component being misregistered in advance of the luminance component by three scanning lines;

b. means, including a delay of three lines, for receiving said input signal and combining each line of it with earlier lines occurring at integral multiples of three lines earlier so as to form, for each line of the input signal a combined signal constituted by proportions of lines of corresponding chrominance, said proportions decreasing with the age of said lines of corresponding chrominance, c. means for comparing combined signals which are separated by an interval of three lines so as to derive a first signal which denotes vertical luminance changes;

d. means for combining three successive combined signals of different chrominance to derive a second, average signal, denoting longer term changes than does said first signal;

e. means including two one-line delays in tandem for obtaining from the input signal the chrominance components of three successive lines in simultaneously available form;

f. means for comparing the said first and second signals with said input signal to derive the chrominance component thereof for each line;

g. means for restricting the band-width of said derived chrominance component to the said lesser band-width:

h. means for comparing the input signal with said derived chrominance component to recover the luminance component of the input signal; and, i. means for reconstituting a composite colour television signal from the recovered luminance component and the simultaneously available chrominance components.

19. A colour television signal decoder, comprising:

a. means for providing an input signal in the form of a luminance component combined with a line-sequential chrominance component of lesser band-width than the said luminance component, said chrominance component cycling through a sequence of components in the form (R−M), (G−M) and (B−M) of which R, G and B represent red, green and blue colour signals and M represent (R+G+B)/3, the chrominance component being misregistered in advance of the luminance component;

b. means including a delay of three lines for comparing combined signals which are separated by an interval of three lines so as to derive a first signal which denotes vertical luminance changes, c. means for combining three successive combined signals of different chrominance to derive a second, average signal, denoting longer term changes than does said first signal;

d. means including at least two one-line delays in tandem for obtaining from the input signal the chrominance components of at least three successive lines in simultaneously available form;

e. means for comparing the said first and second signals with said input signal to derive the chrominance component thereof for each line;

f. means for restricting the band-width of said derived chrominance component to the said lesser band-width:

g. means for comparing the input signal with said derived chrominance component to recover the luminance component of the input signal; and, h. means for reconstituting a composite colour television signal from the recovered luminance component and the simultaneously available chrominance components.

20. A colour television signal decoder according to claim 19, in which said means including at least two one-line delays in tandem for obtaining from the input signal the chrominance components of three successive lines in simultaneously available form comprises:

a chain of three one-line delays in tandem coupled to receive said input signal, whereby four successive lines thereof are simultaneously available; and means for combining the first and fourth of these lines.

21. In a colour television signal decoder in which a colour input line-sequential television signal having a colour sequence recycling in a predetermined number of lines is fed through a plurality of one-line delays and the chrominance component signals which are thereby rendered simultaneously available are cyclically switched by switch means and are reconstituted with luminance components to form a composite colour television signal of normal band-width, the improvement which comprises:

a chain of delay-lines numerically exceeding said predetermined number whereby said signals which are rendered simultaneously available include two signals, a cycle of chrominance apart; and means for combining said two signals.

22. A colour television signal encoder, comprising means for combining a luminance signal and a line-sequential chrominance signal, means for delaying the luminance signal relative to the chrominance signal by a time corresponding to a cycle of the sequence of components of the chrominance signal and means for adding to each line of the luminance signal a signal proportional to the difference between a later line associated with the same chrominance component and an adjacent line of the luminance signal.

23. An encoder according to claim 22 in which the means for adding comprises means for forming an average of said adjacent line and another line and means for comparing this average with said later line.

24. An encoder according to claim 23, in which said means for adding comprises first and second delay-lines connected in series, a first adder coupled to points separated by the second delay-line and means for comparing an average signal formed by this adder with a signal at the input to the first delay line such that the means for comparing produces no output if there if no difference between the various signals at the said input and the points separated by the second delay lines.

25. An encoder according to claim 12, further comprising means for reducing the vertical definition of said chrominance signal.

26. An encoder according to claim 25 in which the means for reducing the vertical definition of the chrominance signal comprises means for combining each line of the chrominance signal with selected proportions of each of a plurality of lines of lines of the chrominance signal.

27. An encoder according to claim 25 in which the means for reducing the vertical definition of the chrominance signal comprises means for obtaining a plurality of signals representing the same chrominance component from a succession of adjacent lines of the line-sequential chrominance signal and means for combining the plurality of signals in various proportions.

28. A colour television signal encoder, comprising:

a first channel for a luminance signal of wide band-width;

a second channel for a line-sequential chrominance signal, said second channel comprising a plurality of one-line delays which provide a multiplicity of different delays each equal to a different multiple of a one-line period;

means for combining the outputs of two different delays differing by one cycle of the line sequence of chrominance; so as to combine two signals of the same chrominance;

an adder for combining the outputs of others of the delays so as to form from two signals of different chrominance a signal of the same chrominance as the said two signals of corresponding chrominance, said adder being connected to feed said means for combining; and means for adding the chrominance signal of the second channel to the luminance signal of the first channel.

29. A colour television signal encoder, comprising:
means for combining a luminance signal and a line-sequential chrominance signal; and
means for adding to each line of the luminance signal a signal representing the difference between a later line associated with the same chrominance component and a line adjacent to said later line.

30. An encoder according to claim 29 in which the means for adding comprises means for forming an average of said adjacent line and the line preceding it, and means for comparing this average with said later line.

31. An encoder according to claim 30, in which said means for adding comprises first and second delay-lines connected in series, a first adder coupled to points separated by the second delay-line and means for comparing an average signal formed by this adder with a signal at the input to the first delay line.

32. An encoder according to claim 30, further comprising means for adding to each line of the luminance signal a signal representing the difference between a second line, later than and of the same chrominance as said later line, and a line adjacent to said second line.

33. An encoder according to claim 29 further comprising means for combining each line of the chrominance signal with selected proportions of each of a plurality of lines of the chrominance signal.

34. An encoder according to claim 29 in which for reducing the vertical definition of the chrominance signal the encoder comprises means for obtaining a plurality of signals representing the same chrominance component from a succession of adjacent lines of the line-sequential chrominance signal and means for combining the plurality of signals in various proportions.

35. An encoder according to claim 29, further comprising means for combining at least that part of the luminance component of common frequency range with the chrominance component with evanescent proportions of the luminance components of earlier lines associated with the same chrominance.

36. An encoder according to claim 35, in which said means for combining comprises a delay corresponding to at least one cycle of the line sequence of chrominance; means for feeding said part of the said luminance component through the delay; and a feedback loop connecting the output of the delay with the input thereof.

37. An encoder according to claim 35, further comprising means for combining at least that part of each line in said common frequency range with a first fraction of a preceding line and means for comparing the resultant signal with a second fraction, greater than said first fraction, of said preceding line, whereby vertical detail in said range is sharpened.

38. In a colour television signal encoder wherein a luminance signal is combined with a cyclically line sequential chrominance signal which is of lesser band-width, the improvement which comprises:

means for combining each line of that part of the luminance signal with said band-width with a fraction of at least the corresponding portion of a line which is one cycle of chrominance earlier;

means for combining the said part a first fraction of the corresponding portion of the immediately preceding line; and means for forming the difference between the combination of said part and the first fraction and a second fraction of the said portion of the immediately preceding line.

39. In a colour television signal encoder wherein a luminance signal is combined with a chrominance signal which is of lesser band-width then said luminance signal and comprises a cyclic line sequence of different chrominance components, the improvement of a chroma softener which comprises: a plurality of delay lines coupled in tandem to receive at least one component of said chrominance signal, whereby a plurality of portions of successive lines of chrominance are rendered simultaneously available; and means for combining said portions in selected proportions to form each line of said chrominance component from a plurality of portions which represent the same chrominance component and come from different lines, whereby each line of the chrominance component is reduced in definition.

40. An encoder according to claim 39, in which three modified colour difference components are received in cyclic line sequence by the chroma softener and in which said means for combining includes means for adding together an instant line of the chrominance signal with at least one later line separated from the said instant line by at least one cycle of chrominance and a line of the same chrominance as the said instant line and formed by combining two other lines of different chrominance.

41. An encoder according to claim 39, in which the chroma softener receives two chrominance components simultaneously, the chroma softener further comprising: means for modulating said two components in quadrature on a carrier signal for passage through the delay lines; a demodulator for recovering the chrominance components from the combined outputs of the delay lines; and a sampling switch for sequentially switching the chrominance components to an output.

42. An encoder according to claim 39, in which the chrominance components are in the form (R-M), (G-M) and (B-M) of which R, G and B represent red, green and blue signals respectively and M represents $(R+G+B)/3$.

43. An encoder according to claim 42, in which said means for combining is coupled to a plurality of points separated by the delay lines and forms for each line of the component (C-M), where C represents R, G and B in turn, a combination of at least two lines of the component (C-M) and at least one line which is a combustion of two different lines each of the other two components.

44. In an encoder which produces at an output a colour television signal constituted by a luminance signal of comparatively wide bandwidth and a chrominance signal comprising a line sequence of different components occupying part of the bandwidth of the luminance signal, the improvement which comprises:

a delay, which receives at least that part of the luminance signal which shares a common frequency range with the chrominance signal, and provides a delay corresponding to at least one cycle of the line sequence of the chrominance components so as to make available for combination at least an instant line of the luminance signal and a line which precedes the said instant line by a cycle of chrominance; and means for combining a fraction of the said instant line with a lesser fraction of the earlier line.

45. An encoder according to claim 44, in which the said means for combining comprises:

an adder which precedes the delay and a feedback loop which couples an output of the delay to the adder, whereby each instant line of the luminance signal is converted into a combined signal comprising a fraction of the instant line and successively evanescent fractions of those earlier lines which precede the instant line by integral cycles of chrominance.

46. An encoder according to claim 45 and including a detail sharpener which comprises:

a recursive filter which includes a delay corresponding to one scanning line, a feedback loop and an adder which feeds to the delay the instant luminance signal and a fraction of the output of the delay, whereby the filter makes available for combination a combination of the instant line of the luminance signal and evanescent fractions of a succession of earlier lines of the luminance signal and, at the output of the filter, a similar combination constituted for the line preceding said instant line; and means for combining the combination of the instant line with fractions of earlier lines with a relatively negative proportion of the said similar combination of the immediately preceding line and the fractions of lines which precede it.

47. An encoder for a line sequential colour television signal of which the chrominance components are in a cyclic line sequence, which encoder comprises:

a. a luminance processing channel comprising:

1. a compensator which includes a succession of delay lines disposed for receiving a luminance signal and to make available, simultaneously with an instant line of the luminance signal, a plurality of following lines and means for adding together the instant line and selected proportions of the said following lines, said proportions defining at least one signal which represents the difference in a luminance detail between a line that follows the said instant line by the time of a cycle of the line sequence of chrominance and the line which is immediately before this later line;
2. a luminance softener which includes a recursive filter disposed to combine each instant line of the luminance signal with evanescent proportions of earlier lines which precede the respective instant line by integral multiples of said time;
3. a detail sharpener including means for combining each instant line of the luminance signal with a fraction of the immediately preceding line and means for forming the difference between the resultant combination and a fraction of the said immediately preceding line; and
4. means for limiting the effects of said compensator, luminance softener and detail sharpener to a low frequency part of the bandwidth of the luminance signal;

b. a chroma processor which provides a chrominance signal in the form of a cyclic line sequence of different chrominance components occupying the said part of said bandwidth and which includes a chroma softener comprising means for combining each line of each chrominance component with like chrominance components derived from different lines of the chrominance signal; and c. means for combining the luminance signal and the line sequential chrominance signal for utilization thereof.

* * * * *